July 4, 1950
C. O. MORRIS
2,514,006
ANCHORED CONNECTOR
Filed April 24, 1944
3 Sheets-Sheet 1
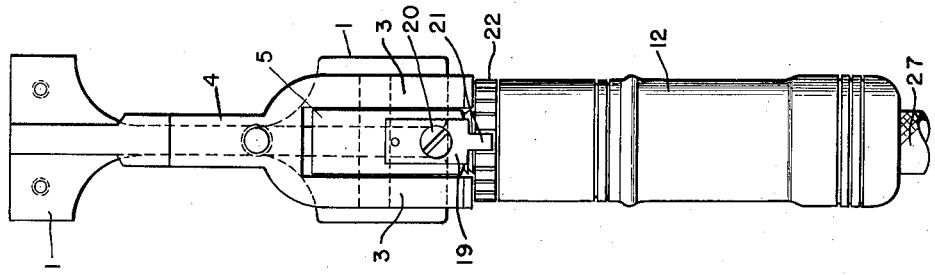
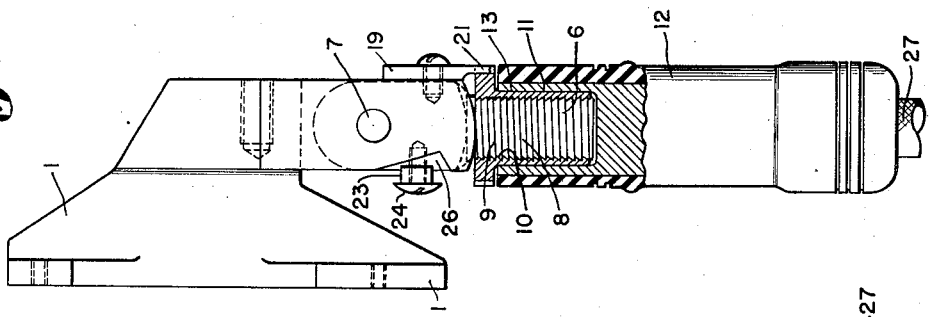
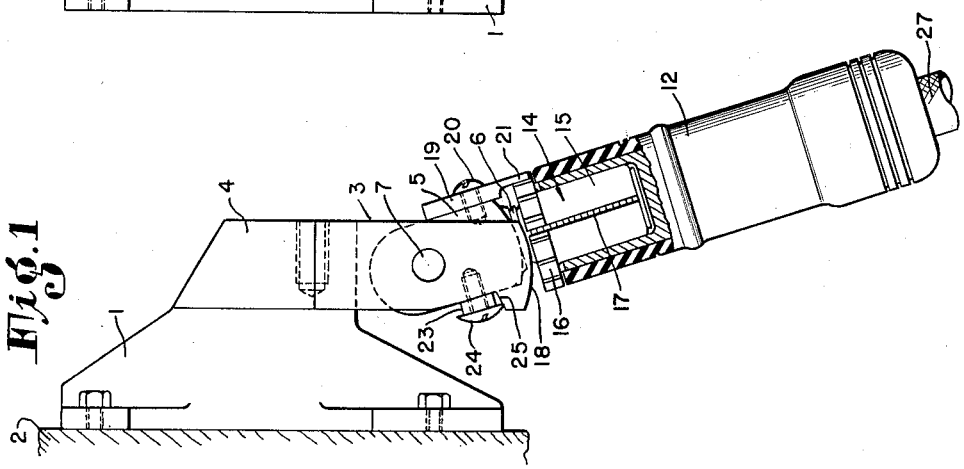
INVENTOR
CHARLES O. MORRIS
BY
ATTORNEY July 4, 1950 — C. O. MORRIS — 2,514,006
ANCHORED CONNECTOR
Filed April 24, 1944 — 3 Sheets-Sheet 2

INVENTOR
CHARLES O. MORRIS
BY
ATTORNEY

July 4, 1950　　　　　　　　C. O. MORRIS　　　　　　　2,514,006
ANCHORED CONNECTOR
Filed April 24, 1944　　　　　　　　　　　　　　　3 Sheets-Sheet 3
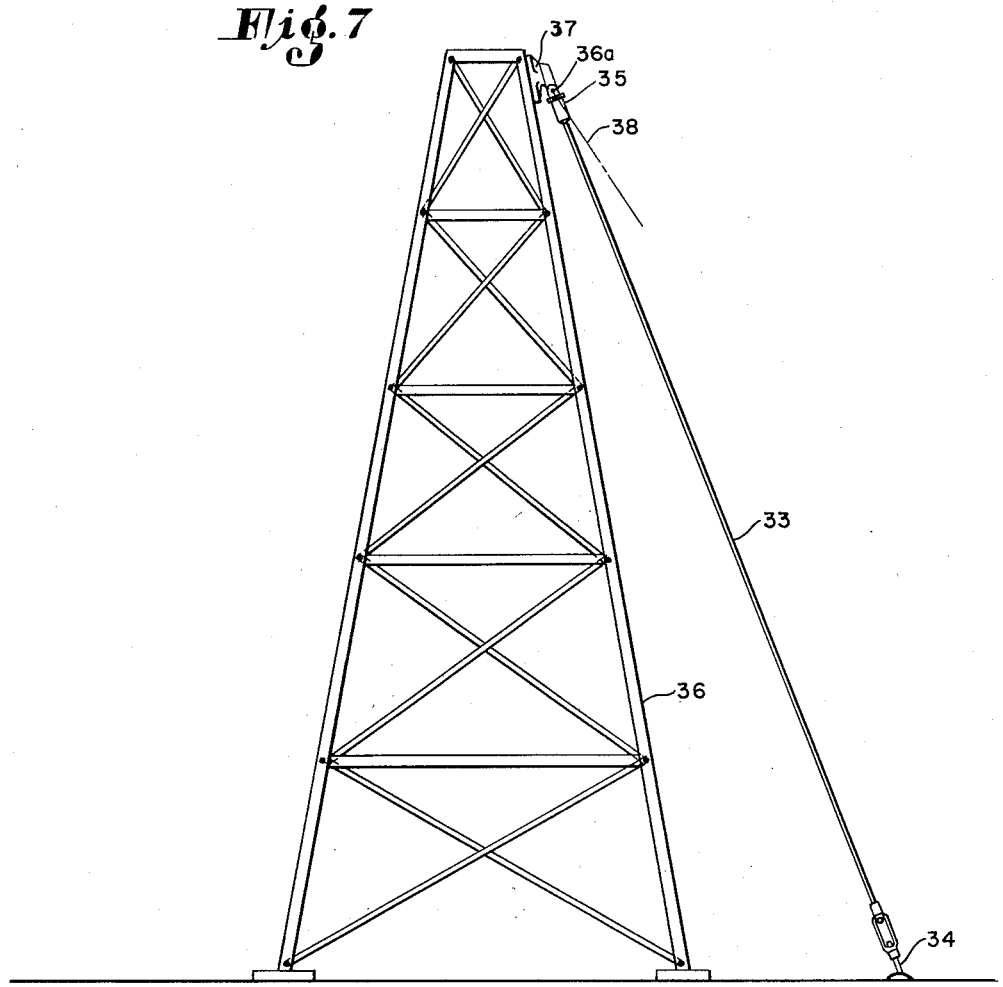
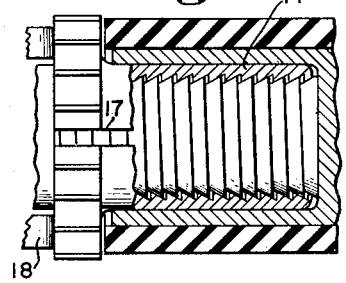
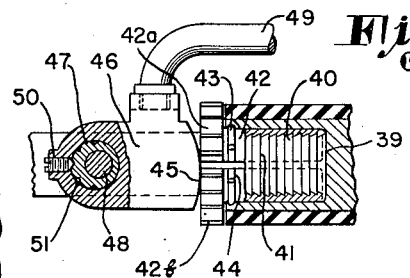
INVENTOR
CHARLES O. MORRIS
BY
ATTORNEY Patented July 4, 1950

2,514,006

UNITED STATES PATENT OFFICE 2,514,006

ANCHORED CONNECTOR

Charles O. Morris, Van Nuys, Calif., assignor to The Garrett Corporation, Airesearch Manufacturing Company division, Los Angeles, Calif., a corporation of California Application April 24, 1944, Serial No. 532,558

18 Claims. (Cl. 287—119)

This invention relates to a connector clamp which is adapted for use in many situations for connecting two members together so that they can be readily disconnected when desired.

One of the objects of the invention is to provide a construction for a connector clamp of this type, operating in such a way that after the members of the connector are telescoped together they can, by very simple means, be clamped rigidly together.

In the preferred embodiment of the invention, one of the members to be connected includes a shank and the other includes a socket into which the shank telescopes when the members are to be connected together. Within the socket and between the shank and the wall of the socket, I provide shiftable clamping means, that can contract or expand to clamp the parts together. One of the members and this shiftable means are provided, in the present instance, with a correlated construction operating in such a way that when a longitudinal shift of one of these parts relative to the other is effected, the clamping means will expand along the diametrical or radial line and jam the shank within the socket. One of the objects of the invention is to provide improved means for effecting this longitudinal shifting movement for clamping the two members together; also to provide a connector clamp of this type with a construction that will enable it to cooperate with a cam for effecting the shifting movement that clamps the parts together.

Another object of the invention is to provide a construction for a connector that will enable the cam referred to above, to be constructed as a part fixed on one of the members or its support; or as a movable cam, movable relatively to both the members that are to be connected.

One of the objects of the invention is to provide a simple construction embodying the features referred to above, so constructed that, after telescoping the shank in the socket, a rotation through a small angle suffices to effect the clamping of the socket on the shank. This rotation may be a rotation of the shank and the socket as an assembly about an axis, or it may be effected by rotation of cam means through a small angle without necessitating the swinging of the connection as an assembly around any axis.

In practice, sometimes it is necessary to provide an overhead connection from the ground to an elevated point, for example, where a guy wire is anchored at one end on the ground and connected at the upper end to an elevated point on some structure such as a derrick. One of the objects of this invention is to provide a connector clamp, particularly adapted for effecting an overhead connection at a point elevated above the ground, which has features of construction which will enable it to be disconnected by shifting the position of the guy wire outwardly at a point below the level of the connector.

Further objects of the invention will appear hereinafter.

The principle of my invention I believe to be broadly new and recognize that it may be embodied in other physical structures. I wish my invention, therefore, to be construed in accordance with the preceding statement of invention, broad statements contained in the description of the preferred forms of my invention, and in accordance with the appended claims. My invention provides certain features which are susceptible of independent use, and it should therefore be understood that my invention is useful not only in its entirety, but different subcombinations and parts are susceptible of independent use.

Referring to the drawings which are for illustrative purposes only:

Fig. 1 is a side elevation and partial section illustrating an embodiment of the invention as applied to an anchor connection for an electric cable that is to be attached to a bus bar. This view shows the members of the connector telescoped, ready to be clamped or locked together by a rotary movement through a small angle, through the agency of a relatively fixed cam.

Fig. 2 is a view similar to Fig. 1, but indicating the relation of the parts after the rotation has taken place that effects the clamping of the disconnectible members together.

Fig. 3 is an elevation indicating the connection as viewed from the right side of Fig. 2.

Fig. 7 is a view illustrating a derrick with a guy wire attached to its peak through the medium of a connector constructed so as to embody the features illustrated in Fig. 1.

Fig. 8 is a side elevation and partial section taken at the point of connection of the two disconnectible members illustrating another embodiment of the invention, involving modifications in the construction of the shank and the expansible means and illustrating a construction that will give an adjustment for the cam, adapting it for use with this modification.

Fig. 9 is a fragmentary section upon an enlarged scale and particularly illustrating the manner in which the cam operates to effect a relative shifting movement between the shank and the expansible means to effect the clamping action. This view shows the expansible means in its fixed and locking position.

Figure 6:
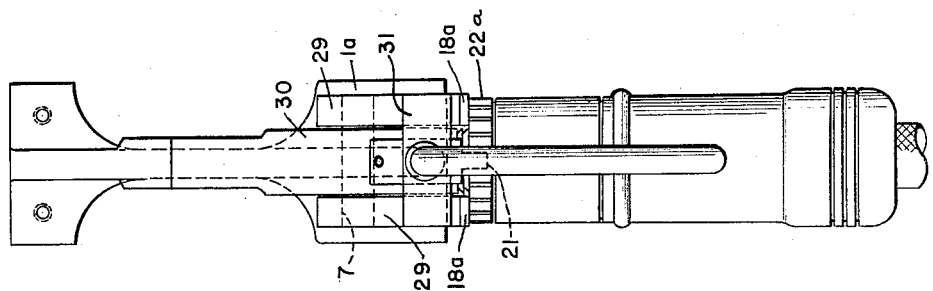
Figs. 4, 5 and 6 are views similar to Figs. 1, 2 and 3, respectively, but illustrating an embodiment of the invention in which the members to be connected are simply telescoped on a fixed axis and are then clamped together through the agency of a movable cam.

In practicing this invention, I provide one of the members with a shank extending from it, and when the other member which carries a socket has been telescoped with the shank, the clamping means of the combination will lie between the face of the socket and the side of the shank. This means and one of the connector members are provided with a correlated form operating in such a way that when a relative longitudinal shift of the clamping means occurs, it will virtually enlarge or diminish in size or thickness or, more accurately, it will move in a diametrical or radial direction so as to cooperate with the two clamping members to jam the shank in the socket. Although in practicing the invention, the expansible means could be constructed to be employed as an insert or liner for the socket, to contract onto the inner member, it is more practical and expedient to construct it as a part to be carried by the shank, in which case the clamping means is in the form of an expansible sleeve, and this sleeve and the shank are provided with correlated engaging faces, the elements of which are inclined at an angle to the axis of the shank. With this arrangement, by moving the expansible means relatively along the axis of the shank, it will be expanded and jammed in the socket that has been telescoped with the shank.

Referring now to Figs. 1 to 3, 1 indicates a bracket which is adapted to be secured to any part that is to support the clamp connector, for example, this bracket may be attached to a bus bar 2, in which case, the connector clamp is preferably below the location of the bracket. To this end, the lower, or outer, portion of the bracket is formed with downwardly extending means for supporting the pivotal connection about which the rotation will take place to effect the clamping of the two clamp members together. In the present instance, the bracket is provided with two spaced arms 3 that are integral with the ridge bar 4 that is itself formed integrally with the body of the bracket. The arms together form a fork. In the space between the two arms 3 there is received a tongue 5 which is formed as an integral extension from a shank 6, and this tongue is attached pivotally between the arms on a pivot pin 7. The shank 6 is preferably provided on its exterior with a thread 8, of a type known as buttress thread, that is to say, it consists of a helical groove having a face 9 that is an abrupt face, disposed in a plane extending transversely and substantially at right angles to the axis of the shank, while the other face 10 of the thread is inclined, that is to say, its elements are inclined at an acute angle to the axis of the shank. This shank is received in a socket 11 that is provided at the upper end of the insulated body 12 of the other connector member, said socket preferably having a cylindrical bore 13; and between this bore 13 and the threaded surface of the shank the expansible means 14 is provided.

In the present instance, this means is illustrated as consisting of a split sleeve having a cylindrical outer surface 15 and having its inner surface provided with a spiral thread which corresponds to, and fits into, the buttress thread on the shank.

The split sleeve that constitutes the expansible means is provided at its upper end with a head 16 that projects laterally, and, in the present instance, the body of this sleeve is formed with a single longitudinal slit or split 17, although, if desired, it is evident that this expansible means could be constructed of a plurality of sections.

The lower ends of the arms 3 are formed with cam faces 18 and these faces, in the relation of parts shown in Fig. 1, are engaged or nearly engaged with the upper face of the collar 16. When the connector members have been telescoped together, as indicated in Fig. 1, the body 12 of the lower clamp member should be swung downwardly on the pivot 7, that is to say, in the general direction of the bus bar 2. When this occurs the cam faces 18 will bear down upon the collar 16 and cause it to shift downwardly sufficiently to cause the threads on the sleeve 14 to ride on the inclined threads of the shank which of course expands the sleeve, and this will force its body outwardly against the face of the bore 13 of the socket 11.

If an adjustment of the position of the sleeve 14 with respect to the cam faces 18 is necessary, this can be had by effecting a slight rotation of the sleeve 14 in either direction, after which it can be locked in any adjusted position by a stop 19, the body of which may be attached by a screw 20 to the edge of the tongue 5, and this stop is provided with a narrow finger 21 which projects downwardly and which can be received in any one of the plurality of spaced slots 22 formed in the periphery of the head or collar 16.

If desired, a stop may also be provided to limit the angle to which the connector can be swung up away from its locked vertical position. For this purpose, the edge of the tongue 5 opposite to the point of attachment of the stop 19 may be provided with a substantially horizontal stop bar 23 that is secured in place by a small screw 24. The adjacent edges of the arms 3 are provided with notches which terminate adjacent the free ends of said arms in shoulders 25 (Figs. 1 and 2), and the ends of said bar 23 are adapted to strike against the bottoms 26 of said notches when the swinging connector part is swung counterclockwise, as shown in said figures, to its limit of movement.

In Figs. 1 and 2, the electric cable 27 that carries the lower clamping member is indicated broken away.

Figure 4:
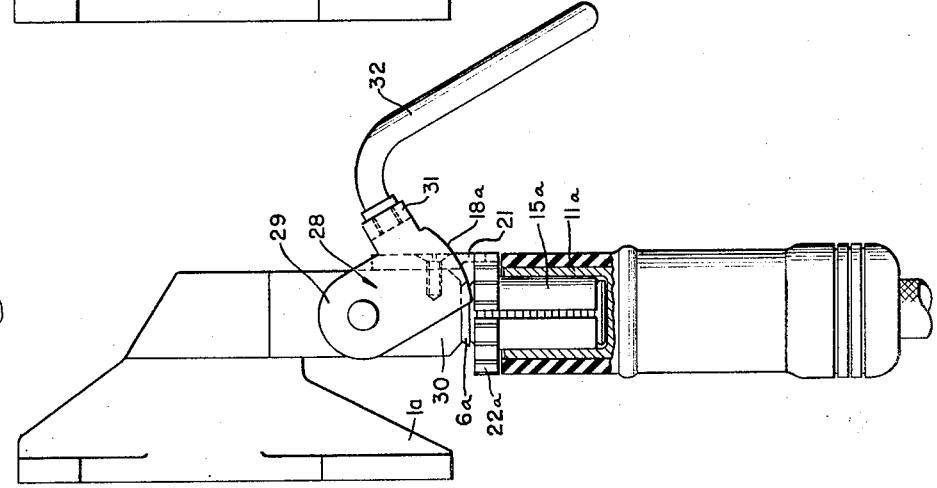

Instead of providing a fixed cam, as illustrated in Figs. 1, 2 and 3, for effecting the clamping of the parts together, I may accomplish this by employing cam means 28 constructed as a separate movable part, and, in that case, this cam is formed with two side arms 29 that are disposed on opposite sides of a tongue 30 that projects down between them from the upper portion of the bracket 1a. These two arms 29 are connected by a connecting bar 31 to which a handle 32 may be attached for operating the cam. In other respects, the construction of the connector is the same as that illustrated in Figs. 1, 2 and 3, and the mode of operation is also the same. In other words, the threaded shank 6a extends down from the lower end of the tongue 30 in a vertical position and, after the lower member of the connection is telescoped over the shank as indicated in Fig. 4, the handle or lever 32 is swung down to bring the cam edges 18a of the cam into forcible contact with the upper end of the sleeve 15a, thereby giving the relatively shifting movement to this part with respect to the shank that will expand it and clamp it securely within the socket 11a.

Figure 5:
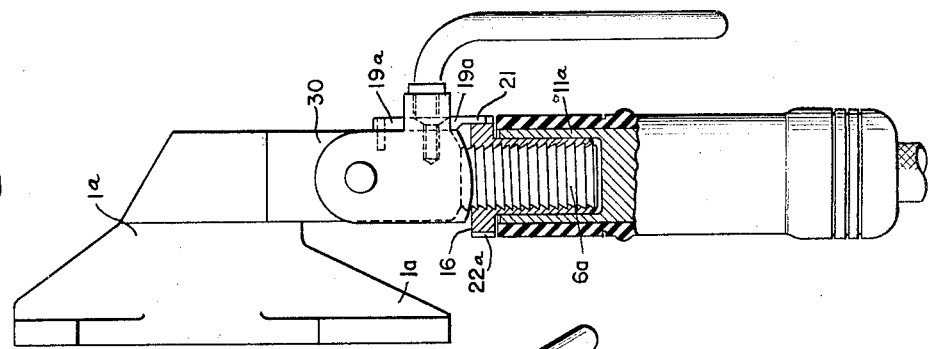

This embodiment of the invention is provided with a stop 19a similar to the stop 19, to cooperate with the slots 22a cut in the periphery of the head, as shown in Fig. 5.

In Fig. 7, I illustrate a special application of this invention to an overhead mounting to support the upper end of a guy wire 33, the lower end of which is anchored to a ground anchor 34 and the upper end of which is attached to one of my connector clamps 35 that is attached to the peak of the derrick 36.

The inclination of the guy wire 33 as illustrated is rather slight, and, in practice, might be considerably more, so that the anchor point 34 would be farther from the derrick. However this is immaterial. In this case, the construction of the connector is substantially the same as that illustrated in Fig. 1, except, of course, that the bracket 37 is constructed so that the shank corresponding to the shank 6 projects down from the body of the bracket 37 in an inclined direction, in line with the direction to which the guy wire 33 extends.

The connector member 35 is mounted to swing on the pivot 36a, corresponding to the pivot 7, and is swung outwardly toward the right, for example, through a small angle indicated by the position of the dotted line 38, since if it were swung through a large angle, the clamp would be unlocked or released by its cam. The pivot 36a, of course, is mounted with its axis in a horizontal plane. If it is desired to release this overhead connection without the necessity for a man ascending to the peak of the derrick, this can be accomplished by disconnecting the guy wire 33 at its anchor 34, and carrying the lower end of the guy wire to a greater distance away from the foot of the derrick, at the same time pulling the guy wire taut. If the angle indicated between the line 38 and the normal position of the guy wire 33 is so great that this cannot be accomplished by a man still maintaining hold of the lower end of the guy wire, then an extension wire could be attached to the lower end of the guy wire. Also in the case of a light guy wire, it is possible to disconnect it by a whipping or snapping action developed by a sudden outward movement of the lower end of the guy wire. This would be in such a way as to produce a wave in the guy wire, running up from the ground to the connection and, when this wave arrives at the connection, it would cause a movement of the guy wire outwardly sufficient to disengage the connection.

In Fig. 9, I illustrate upon a larger scale the action of the expansible member 14 when the cam edges 18 have pushed this part down or toward the right, as shown in Fig. 9, causing the inclined faces of the expanding sleeve to ride up on the inclined faces of the shank.

The invention may be practiced, if desired, by employing circumferential grooves without any pitch, that is, simple circumferential corrugations, on the shank, instead of the continuous spiral thread as illustrated in Figs. 1 to 6. This is illustrated in Fig. 8, in which the shank 39 is provided with a plurality of circumferential grooves presenting conical faces 40 with abrupt shoulders 41 at the ends of the inclined faces. In this case, of course, it is not possible to screw the sleeve onto the shank, and hence in this case I prefer to form the expansion sleeve of two or more sections 42a and 42b. These sections would be applied to the shank by an inward radial movement toward the shank. If desired, a spring wire 43 can be employed to hold the sections of the sleeve on the shank. This spring wire 43 would be applied in a shallow groove 44 formed in the sleeve near its outer end to keep the wire 43 in position. This sleeve 42 would cooperate in the same way as described before, with cam edges 45. There is, however, no possibility of adjusting the end of the sleeve with respect to the cam edges 45; hence, if desired, an adjustment for the cam 46 may be provided, for example, such an adjustment can consist of eccentric sleeve 47 mounted in each arm, that envelops the pivot pin 48, on the axis of which the cam 46 may be rotated by means of its handle 49. The eccentric sleeve 47 may be adjusted around and locked in any adjusted position by a small set screw 50, having a point that can be received in any one of a plurality of small recesses or sockets 51, spaced equidistant around the circumference of the sleeve.

Many other embodiments of this invention may be resorted to without departing from the spirit of the invention.

I claim as my invention:

1. In a connector clamp for connecting two members, the combination of: a member having a shank extending therefrom; expansible clamping means received over said shank; a second member having a socket receiving the said expansible means one of said members and said clamping means having correlated engaging faces, the elements of which are inclined at an angle to the axis of the shank; and cam means including a lever pivoted to the first mentioned member for effecting relative longitudinal movement of the clamping means and said shank; said cooperating engaging faces operating to clamp the clamping means between the two members and secure the same together.

2. In a connector clamp for connecting two members, the combination of: a member having a shank extending therefrom; expansible means received over said shank; a second member having a socket receiving said expansible means; said expansible means and said shank having correlated engaging faces, the elements of which are inclined at an angle to the axis of the shank; and cam means associated with said members for effecting a relative longitudinal movement of the shank and the expansible means cooperating with the engaging faces to expand the expansible means in the socket and clamp the same therein.

3. In a connector clamp for connecting two members, the combination of: a member having a shank pivotally attached thereto and extending therefrom; expansible means received over said shank; a second member having a socket receiving said expansible means, said expansible means and said shank having correlated engaging faces inclined at an angle to the axis of the shank; and cam means on the first named member for engaging the expansible means when the shank and the other member, slipped over the expansible means, are rotated about said pivotal axis.

4. In a connector clamp for connecting two members, the combination of: a member having a shank extending therefrom; expansible means surrounding said shank, a second member having a socket, to be slipped over said expansible means; said expansible means and said shank having correlated engaging faces, the elements whereof are inclined at an angle to the axis of the shank; and cam means pivotally mounted on the first named member and rotatable thereon for effecting a relative longitudinal movement of the shank and the expansible means; thereby enabling the inclined engaging faces to expand the expansible means in the socket and clamp the same therein.

5. In a connector clamp for connecting two members, the combination of: a member having a shank extending therefrom; an expansible split sleeve received over said shank; a second member having a socket to slip over said split sleeve; the inner face of said split sleeve and the outer face of said shank having correlated engaging faces cooperating upon a relative longitudinal movement of the shank and sleeve, to expand the sleeve; and cam means associated with said members for effecting a relative longitudinal movement of said shank and sleeve, to expand, and clamp the sleeve in the socket.

6. In a connector clamp for connecting two members, the combination of: a member having a shank extending therefrom, said shank having circumferential grooves thereon having faces disposed in a direction transverse to the axis of the shank; and having inclined faces, the elements whereof are disposed at an acute angle to said axis; a second member having a socket therein to slip over the shank; a split sleeve fitted over said shank and having an opening therethrough with circumferentially disposed grooves formed to correspond with the grooves of said shank with inclined faces engaging the inclined faces of the shank, said sleeve cooperating with the shank when fitting closely into the grooves thereof to permit the sleeve to be received in said socket; and cam means associated with said members for engaging said sleeve to shift the same longitudinally of the shank and thereby effect relative longitudinal movement of the shank and the split sleeve, causing the said inclined faces to cooperate to expand the sleeve in the said socket and secure the members together.

7. In a releasable overhead guy wire connection to the upper end of a derrick or the like, the combination of: a bracket adapted to be attached to the upper end of the derrick; a connector member pivotally attached thereto on a substantially horizontal pivot and extending outwardly from said bracket at an angle inclined in a downward and outward direction; a second connector member, telescoping with the first named member, expansible means disposed between said members; said expansible means and one of said members having cooperating faces, the elements of which are inclined to the axis of said telescoping members; and a relatively fixed cam having a cam face for normally exerting a force upon said expansible member to hold the same shifted longitudinally with respect to the said member having corresponding inclined faces, said cam face being disposed so as to release the expansible member when the connected members are swung on said pivot outwardly and away from the derrick at their lower end.

8. In a releasable overhead guy wire connection to an elevated support, the combination of: a bracket adapted to be attached to the elevated support; a connector member pivotally attached thereto on a substantially horizontal pivot and extending outwardly from the bracket at an angle inclined in a downward outward direction; a second connector member telescoped with the first named member; expansible means disposed between said members, said expansible means and one of said members having cooperating faces, the elements of which are inclined to the axis of said telescoped members; and a relatively fixed cam having a cam face for normally exerting a force upon said expansible member to hold the same shifted longitudinally with respect to the said member having corresponding inclined faces, said cam face being disposed so as to release the expansible member when the connected members are swung on said pivot outwardly and away from the support at their lower ends; said parts constructed so that they are capable of cooperating to enable the connection to be disconnected from a point on the ground by snapping or carrying the cable outwardly so as to swing the pivoted member around the axis of its pivot.

9. In a releasable overhead guy wire connection to the upper end of a derrick or the like, the combination of: a bracket adapted to be attached to the upper end of the derrick; a connector member pivotally attached thereto on a substantially horizontal pivot and extending outwardly from said bracket at an angle inclined in a downward and outward direction; a second connector member, telescoping with the first named member; expansible means disposed between said members; said expansible means and one of said members having cooperating faces, the elements of which are inclined to the axis of said telescoping members; and a relatively fixed cam having a cam face for normally exerting a force upon said expansible member to hold the same shifted longitudinally with respect to the said member having corresponding inclined faces, said cam face being disposed so as to release the expansible member when the connected members are swung on said pivot outwardly and away from the derrick at their lower end; said parts constructed so that they are capable of cooperating to enable the connection to be disconnected from a point on the ground by snapping or carrying the cable outwardly so as to swing the pivoted member around the axis of its pivot.

10. In a connector for two members, the combination of: a member; a male connector element pivoted thereon, the other of said members having a socket receiving said element; clamping means cooperating between said two members, and means operative upon pivoting of said male connector element to cause the clamping means to grip said two members together.

11. In a connector clamp for connecting two members, the combination of: a member having a shank pivoted thereto extending therefrom; expansible clamping means received over said shank, said shank and said clamping means having interacting formations thereon so that relative movement of the shank and clamping means effects expansion of said clamping means; and a second member having a socket receiving the said expansible means and thereby effecting a pivotal connection between the two members, one of said members and said clamping means having correlated engaging faces arranged so that upon relatively moving the two members on said pivot clamping is effected.

12. In a connector clamp for connecting two members, the combination of: a member having a shank extending therefrom; expansible clamping means received over said shank; a second member having a socket receiving said expansible means; and cam means associated with said members for effecting relative longitudinal movement of the clamping means and said shank, the cam means and the shank being mounted for relative movement with respect to each other about an axis located at the point of connection between the two members.

13. In a connector for two members, the combination of: a member having a male connector element thereon, a second member having a socket receiving said element, one of said members being pivotally supported; clamping means cooperating between said element and one of said members; and means operative upon pivoting of said pivotally supported member to cause the clamping means to grip said two members together.

14. In a connector for two members, the combination of: a supporting member, a socketed element, a male element received by said socketed element, means forming a common pivot for said elements on the supporting member when the male element is received by the socketed element, and means for clamping the elements together when the elements are moved together on said pivot.

15. In a connector: a pair of members; a male connector element pivotally connected to one of said members, the other of said members having a socket receiving said element; clamping means cooperating between said connector element and the other member; and means operative upon pivoting of said connector element and the member received thereon relative to the other member to cause the clamping means to clampingly engage said element and said other member.

16. In a connector: a supporting member; a socketed element; a male element received by said socketed element; means forming a common pivot for said elements on the supporting member when the male element is received by the socketed element; gripping means disposed between said elements; and means on the supporting member and engageable with the gripping means for causing said gripping means to grip said elements together when said elements are pivotally moved.

17. A connector, comprising: two interthreaded clamping members adapted to be moved axially relative to each other, one of said clamping members having parts adapted to move radially upon relative axial movement; means supporting said members; and means pivoted on the supporting means, the pivoted means being so constructed and arranged as to produce relative axial movement of the clamping members, and hence, effect radial movement in the one clamping member, upon relative pivoting of the pivoted means and the supporting means.

18. In a connector: a member having a shank element extending therefrom; a socketed element received on said shank element; means for clamping said elements together; and lever means pivoted on said member and having cam surfaces adapted to engage said clamping means and actuate same so as to releasably clamp said elements together.

CHARLES O. MORRIS.

REFERENCES CITED

The following references are of record in the file of this patent:

FOREIGN PATENTS

| Number | Country | Date |
|---|---|---|
| 451,448 | Germany | Oct. 27, 1927 |

Certificate of Correction

July 4, 1950

Patent No. 2,514,006

CHARLES O. MORRIS

It is hereby certified that error appears in the printed specification of the above numbered patent requiring correction as follows:

Column 4, line 24, after the word "ride" insert *up*; column 10, line 33, after "patent:" and before "FOREIGN PATENTS" insert the following:

UNITED STATES PATENTS

| Number | Name | Date |
|---|---|---|
| 1,418,329 | Schade | June 6, 1922 | and that the said Letters Patent should be read as corrected above, so that the same may conform to the record of the case in the Patent Office.

Signed and sealed this 3rd day of October, A. D. 1950.

[SEAL]

THOMAS F. MURPHY,
*Assistant Commissioner of Patents.*